April 7, 1936.  J. H. EMMERICH  2,036,622
CYLINDRICAL LENS OPTICAL SLIT FOR SOUND RECORDING
Filed July 19, 1935  2 Sheets-Sheet 1
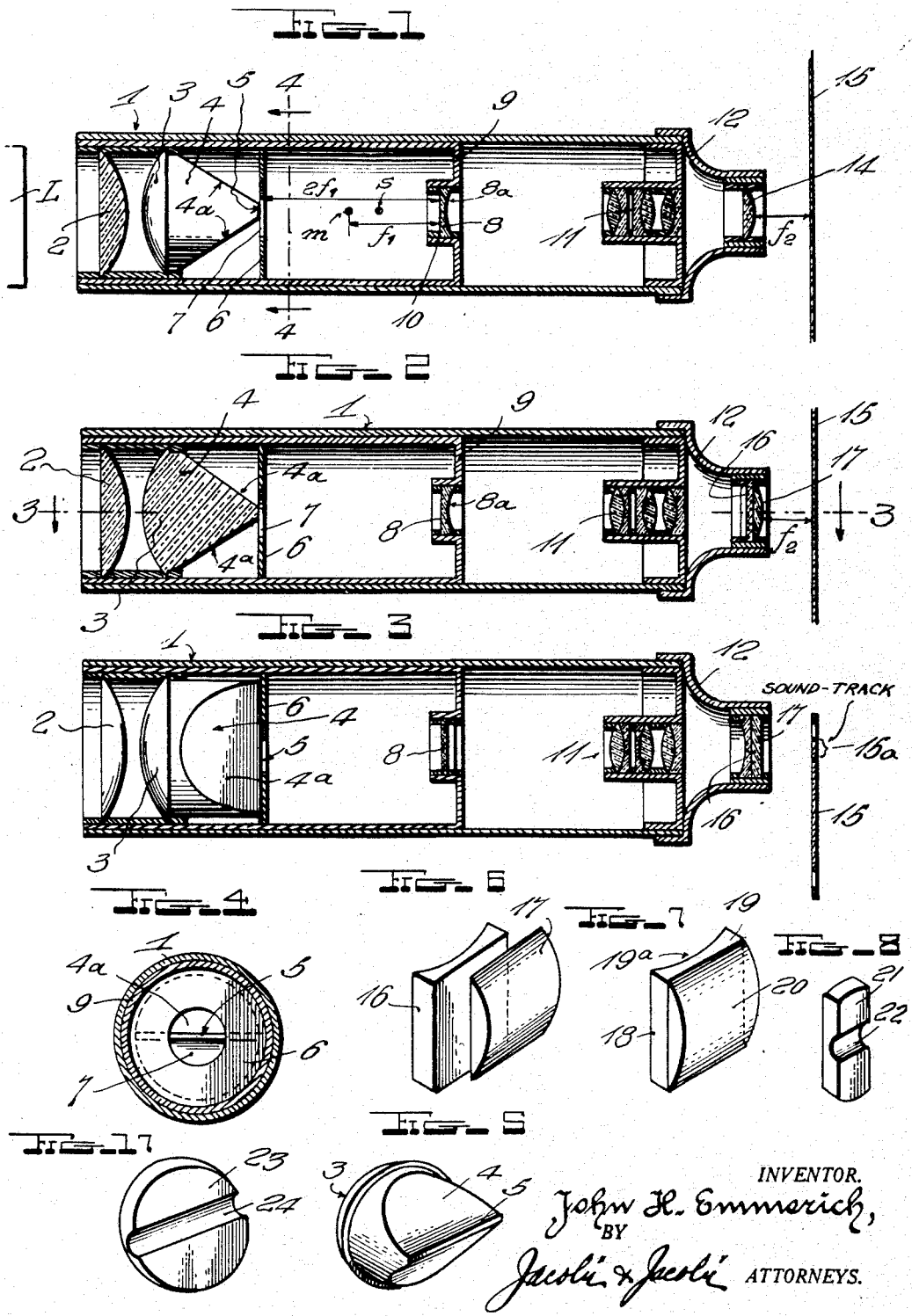

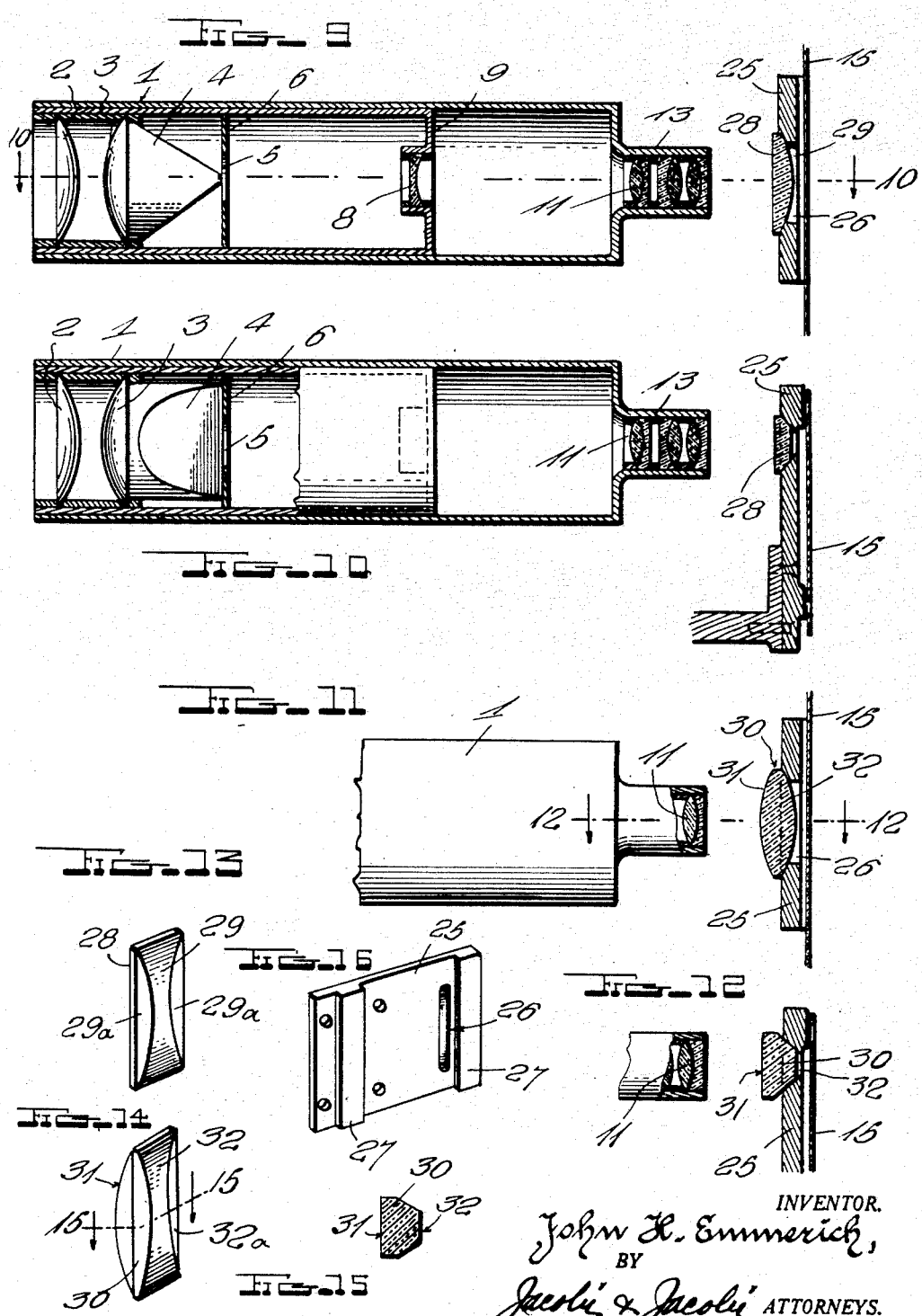

Patented Apr. 7, 1936

2,036,622

UNITED STATES PATENT OFFICE 2,036,622

CYLINDRICAL LENS OPTICAL SLIT FOR SOUND RECORDING

John H. Emmerich, Rosedale, N. Y., assignor to Holmright Holding Corporation, New York, N. Y., a corporation of New York Application July 19, 1935, Serial No. 32,278

15 Claims. (Cl. 88—24)

In the variable density method of recording sound on film, the optical system interposed between the varying light source and the sensitive film conventionally consists of a condenser and an objective, with a mechanical or other slit. This type of conventional optical system is usually open to the objection that the image or striation produced on the sound track of the film is excessively wide for good reproduction or that a sufficient flux of light is not delivered to the film to produce a clear image. The usual desired width of striation for the sound track of a 35 millimeter film is about 0.001 inch (0.025 mm), and less for 16 millimeter film.

For 16 millimeter film the striation must be not over 0.0003 to 0.0005 inch wide, especially for high notes, whereas on 35 millimeter film there can be used a striation 0.0010 inch wide, or even sometimes 0.0020 inch wide. With 16 millimeter film, it is particularly important to have an intense beam, to get adequate light variations for good reproduction.

The optical system which I here describe is particularly adapted for sound recording and sound reproduction with film, but it is evident that my system has also other optical applications, which will be obvious to those skilled in the art.

The optical system which I describe is suitable for application both to the type of sound recording camera which is provided with a slotted film gate, and also with the type of sound camera having no slotted gate.

In my Patent No. 1,821,623 dated September 1, 1931, I have provided a condensing system comprising a triangular prismatic lens for the purpose of obtaining an image on the film of particular desired characteristics.

In order to get good reproduction, it is necessary to produce on the sound track on the film, clear striations, and this requires the delivery to the film of a sufficient total volume of light flux. The total volume of the light flux cannot be increased inside the optical system, once such light flux has been delivered thereto, but the light flux can simply be concentrated by the optical system, and hence it is important that this total light flux delivered to the optical system shall be as large as possible. The only way to increase this total light flux is to increase the effective width of the original light slit from which the light flux is obtained.

The present invention provides for materially increasing, by 100 to 200% or more, the light flux impressed on the film to produce a striation of a determined width, such as 0.001 inch, by providing an optical system capable of more intensely concentrating the sound modulated beam from the recording light source.

An object of my invention is to provide an optical system capable of intense concentration of a light beam to a very fine line.

A further object of my invention is to provide a system for recording sound on film wherein minute sound differences are faithfully recorded on film sound track as clearly defined images.

Another object of my invention is to provide an optical lens system for sound recording comprising a prismatic lens and a plurality of cylindrical lens elements for the purpose of increasing the concentration and intensity of the light beam.

Still another object of the invention resides in providing a device which is simple and durable in construction, inexpensive to manufacture and one which will be very efficient in application to use.

With these and numerous other objects in view, my invention consists in the novel features of construction, combination and arrangement of parts as will be hereinafter referred to and more particularly pointed out in the specification and claims.

I employ particular types of cylindrical lenses in the particular manner which I describe, not simply to form an optical slit, but to make possible the employment of a wider original light source slit than would otherwise be possible, and hence to increase the total light flux usefully delivered for recording.

The effect of the cylindrical lenses, in general, is to converge or concentrate the light beam in the direction perpendicular to the axis of the cylindrical lens, but no material converging is applied to the beam in the direction parallel to the axis of the cylindrical lens. The concentration of the beam takes place primarily in the direction which will result in a narrower striation on the film.

In the description which follows, I have described my invention as applied to a specific embodiment of particular optical dimensions, but it will be understood that the elements of my invention can be applied with various other particular optical dimensions, without in any way changing the principles of my invention.

In the accompanying drawings forming a part of this application:

Figure 1 illustrates the general principle of my invention, and is a vertical sectional view partly in elevation of a simple form of the optical system of my invention, with an intermediate negative cylindrical lens, and a single positive cylindrical lens as the final lens, without a slotted film gate;

Figure 2 is a vertical sectional view of a form of my invention similar to Figure 1, but with the final lens unit comprising crossed negative and positive cylindrical lenses;

Figure 3 is a horizontal sectional view partly in elevation of the embodiment of Figure 2, taken on the line 3—3 of Figure 2;

Figure 4 is a transverse vertical sectional view, perpendicular to the tube axis, taken on the line 4—4 of Figure 1, showing the prism edge and its retaining diaphragm;

Figure 5 is a detailed perspective view of the prismatic lens element with bevelled edge;

Figure 6 is a detailed perspective view showing the crossed negative and positive cylindrical lens elements of Figure 2, separated and in juxtaposition;

Figure 7 is a detailed perspective view of a single lens blank having the opposed faces respectively formed as the negative and positive cylindrical lenses of Figure 6;

Figure 8 is a perspective view of one particular form of the intermediate negative cylindrical lens, which is provided with a diametral semi-cylindrical aperture;

Figure 9 is a vertical sectional view of a form of my invention applied to a sound camera having a slotted film gate, employing a simple cylindrical lens as the final lens;

Figure 10 is a horizontal sectional view taken on the line 10—10 of Figure 9;

Figure 11 shows a detail of a form of my invention as applied to a camera with slotted film gate as in Figure 9, and shows a modification of the arrangement of Figure 9, employing as the final lens a cylindrical lens having opposed positive cylindrical faces with parallel axes;

Figure 12 is a horizontal sectional view taken on the line 12—12 of Figure 11;

Figure 13 is a perspective view of the simple cylindrical lens of Figure 9, having one plane surface and one positive cylindrical surface;

Figure 14 is a perspective view of the doubly cylindrical lens of Figure 11, with opposed positive cylindrical faces with parallel axes;

Figure 15 is a horizontal sectional view of the doubly cylindrical lens taken on the line 15—15 of Figure 14;

Figure 16 is a perspective view of the slotted film gate of Figure 9; and

Figure 17 is a perspective view of a form of the intermediate negative cylindrical lens similar to that shown in Figure 8.

Referring to the figures in detail, in Figure 1, 1 is a cylindrical optical casing having at one end a usual condenser system here shown as plano-convex lenses 2 and 3. Figure 1 shows a simple type of sound recording camera or reproducing system which does not employ a slotted diaphragm or film gate. In applying my optical slit system for sound recording, adjacent to the condenser, there will be the exciter lamp L, which varies in intensity with the sound wave to be recorded. The triangular prism 4, here shown as an isosceles triangular prism, has its base parallel and adjacent to the plane surface of condenser lens 3, and will ordinarily be in contact with lens 3, and the lens 3 and prism 4 may be formed integrally in one piece. The vertex of triangular prism 4 opposite the base adjacent lens 3, is beveled off substantially parallel to the base, to form a narrow terminal edge or "slit" as shown at 5, whose dimensions depend on the film employed. For 35 millimeter film, the slit can be about 0.300 millimeters wide, and of the order of 10 millimeters long, depending on the width of the sound track employed and the maximum allowable width of striations on the sound tracks.

The apparent width of the slit of light delivered will be reduced by the successive elements of my optical system by a factor of about twelve, so that with the source slit just mentioned, the apparent width of the striation of light recorded on the sound track on the film is about 0.025 millimeter. As has been explained, on 35 millimeter film, it is possible to use a striation .025 millimeter wide or even .050 millimeter wide, but on 16 millimeter film a narrower striation must be used, from 0.0075 to 0.0125 millimeter wide. For faithful reproduction of high notes, the smaller values of striation width must be employed. With 16 millimeter film, in order to get adequate volume of output with faithful reproduction, it is therefore, particularly important to employ as wide a beveled prism edge as possible and still not exceed the maximum allowable width of film striation, and this means an optical system that will give as large a factor of slit width reduction as possible.

The triangular prism 4 has its base cut to fit inside the cylindrical casing, as shown particularly in Figure 5, which shows an integral unit comprising prism 4 and plano-convex lens 3. The lateral faces 4a of the prism 4 are preferably blackened from the base to the apex edge 5.

A diaphragm 6 having a central aperture 7 in register with prism edge 5 is fitted inside casing 1 ahead of prism 4 and retains prism 4 in position.

In the end of casing 1 opposite the condenser 2, 3, is fitted an objective unit 11, here shown as three doublets. This objective lens unit is of conventional type and may consist of the usual circular lenses. Between the prism edge 5 and objective 11 is centrally positioned a negative cylindrical lens 8 having its concave cylindrical face 8a facing toward the objective 11, and having its axis substantially parallel to the length of the beveled edge 5 of prism 4. An inner sleeve member 9 fits inside casing 1 and has a flange portion 10 in which cylindrical lens 8 is fitted.

The principal focal length of negative cylindrical lens 8 is here designated as $f_1$, and lens 8 is mounted so that the distance from the beveled edge 5 of the prism, to lens 8, is substantially twice the principal focal length $f_1$ of lens 8. I have found this arrangement to be most desirable. In practice $f_1$ is about 12 millimeters. The point $m$ is shown as half way between prism edge 5 and lens 8, and therefore, the distance from $m$ to lens 8 is equal to $f_1$. It is also convenient in considering the optical properties of my optical system, to consider a transverse plane through the point $s$ which is taken at one-third of the distance from lens 8 to prism edge 5. As seen through lens 8 from a point adjacent the objective, the apparent width formed at $s$ of the image of the slit or edge 5, will be only one third of the actual width of 5. In the optical system which I describe, the effect of cylindrical lens 8 is to reduce the apparent slit width by a factor of about three, but optical systems of other constants in the same range will produce results of correspondingly changed characteristics.

In the arrangement shown in Figure 1, a terminal member 12 is carried on casing 1, wherein is fitted a simple positive cylindrical lens 14, shown as having one convex surface, and one plane surface facing toward the objective. The axis of positive cylindrical lens 14 is substantially parallel to the length of the bevelled edge 5 of prism 4 and the axis of negative cylindrical lens 8. The principal focal length of positive cylindrical lens 14 is here taken as $f_2$. The unexposed film 15 having a sound track 15a, moves vertically past the lens system of Figure 1, and is mounted at a distance from lens 14 equal to this principal focal length $f_2$ of lens 14, which in practice will be about 8 to 12 mm.

The curvature of the cylindrical surface of lens 14 depends, in practice, on the aggregate effective focal length of the entire optical system from the condenser 2 to cylindrical lens 14.

The curvature of cylindrical lens 14 is in general not the same as the curvature of cylindrical lens 8. The curvature of cylindrical lens 8 necessarily depends on $f_2$.

The effective focus of the condenser lenses 2, 3, with prism 4, is approximately in the beveled edge 5 of prism 4, or very slightly toward the objective therefrom.

In practice, the objective system 11 can itself be so constructed as to reduce the apparent width of the slit 5 by one half, without any cylindrical lens. However, if the attempt is made to get a larger reduction factor by the objective alone, the objective will have an extremely short focus and an extremely small diameter, which will mean that only a comparatively small light flux can be handled, and the use of such an objective will lose more than it gains. Therefore, it is necessary to use some other element in the optical system, and it is for this purpose that I provide my cylindrical lenses.

A disadvantage of the type of optical system shown in Figure 1 is that the linear image of slit 5 as projected on to the film, is not cut off at either end, or is not "framed", but continues indefinitely at both ends, and the ends are necessarily blurred. One possible way to avoid this condition, is to turn the final cylindrical lens 14 so that its axis is parallel to the direction of film travel, that is, perpendicular to the axis of cylindrical lens 8 instead of being parallel thereto. This will result in cutting off the ends of the slit image, and cylindrical lens 14 will still to a considerable extent reduce the width of the slit image. However, this is not a very satisfactory way in which to cut off the image ends, and loses considerable light, and for this reason I prefer to employ other arrangements hereinafter described.

A preferable embodiment of my invention is shown in Figures 2 and 3, wherein between the objective 11 and the film 15 is positioned a composite cylindrical lens unit consisting of two crossed cylindrical lenses 16 and 17, mounted in juxtaposition. 17 is a positive cylindrical lens, plane on one side, as in Figure 1, with its curved face pointing toward the film, and with its axis perpendicular to the direction of film travel or parallel to the prism edge 5, as in Figure 1. 16 is a negative cylindrical lens having one plane face and one concave cylindrical face which points toward the objective, and having its axis substantially perpendicular to the axis of cylindrical lens 17. The plane faces of lens 16 and 17, therefore, face each other as shown in Figure 6. These two lenses 16 and 17 will ordinarily be in contact, and in fact, it is convenient to form the two cylindrical surfaces of 16 and 17 on a single integral lens blank as shown in Figure 7. The axis of negative cylindrical lens 16 is substantially perpendicular to the axis of lens 17. The radius of the cylinder of lens 16 is ordinarily but not necessarily approximately the same as the radius of the cylinder of lens 17. The use of these two crossed cylindrical lenses results in cutting off the ends of the slit image sharply, which was not accomplished by the arrangement of Figure 1. The length of the slit image formed by the arrangement of Figure 2, depends on the radius and characteristics of the added negative cylindrical lens 16. Also, in the arrangement of Figure 2, the distance $f_2$ from the final cylindrical lens 17 to the film 15, is about 9 millimeters, in practice.

In Figures 1 and 2, the intermediate negative cylindrical lens is shown as an ordinary type of negative cylinder having a concave surface over the entirety of one face. I have, however, found that a particular form of negative cylindrical lens is particularly suitable for use as the lens 8, and such a structure of lens is shown in Figure 8. This consists of a lens blank 21 fitting inside the mounting member 10, having a diametral cylindrical aperture 22 cut therein. The aperture 22 will face objective 11, as in Figures 1 and 2. This type of lens concentrates the slit image more intensely. Another embodiment of this type of negative cylindrical lens is shown in Figure 17, where the circular lens blank 23 is provided with the diametral cylindrical aperture 24.

In one type of sound recording camera which is commercially used, the film moves through a film gate 25 as shown in Figure 16, between film guides 27, 27. Over the sound track of the film the film gate 25 is provided with the slot 26, whose long sides cut off the ends of the image of the light slit. For 35 millimeter film, this slot 26 in commercial apparatus, is usually about one-eighth inch in width.

Figures 9 and 10 show an application of my invention to the type of sound camera employing such a slotted film gate. A simple positive cylindrical lens 28, of the general type shown at 14 in Figure 1, is mounted in the gate slot 26, with the axis of the cylindrical lens 29 substantially perpendicular to the slot length. In the arrangement of Figures 9 and 10, the positive cylindrical lens 28 has a plane face on one side, and a convex face 29 on the other side which fits into the gate slot and points toward the film 15. The curved face 29 of lens 28 is bevelled off as shown at 29a, so as to fit snugly into the slot 26 in the film gate. In employing such a film gate, the film 15 when passing between guides 27, passes almost in contact with lens 28. In this embodiment, it is therefore important that lens 28 shall be strong, that is, have a small radius of its cylindrical surface, since the focus of cylindrical lens 28 should still be formed substantially in the plane of film 15, as in the arrangements of Figures 1–3. It may be found necessary to specially design the objective employed in this form of camera when adding cylindrical lens 28, in order to bring the focus of the system in sufficiently close to the cylindrical lens, to be substantially in the plane of the film when passing over the film gate 25.

I have found that a plano-cylindrical lens as shown in Figures 9 and 10, does not fit as snugly and tightly into the gate slot, as will a doubly cylindrical lens having two opposed convex cylindrical surfaces with parallel axes. The application of such a doubly cylindrical lens to the slotted diaphragm apparatus of Figure 9, is shown in Figures 11 and 12. The double convex cylindrical lens is shown at 30, having convex cylindrical faces 31 and 32 with axes which are parallel to each other and perpendicular to the length of gate slot 26. As shown in Figure 14, the cylindrical face 32 is bevelled at 32a to fit more snugly into the slot 26.

In applying my invention to the form of sound camera having a slotted film gate, as in Figure 9, it is also possible to employ crossed cylindrical lenses as shown in Figures 2 and 6, but this is not really necessary, since the sides of the gate slot cut off the ends of the slit image.

In applying the optical system of my invention to a particular sound camera, as I have explained, it will often be found necessary to employ a specially designed objective or other optical elements, in order to place the focus in the desired point.

In an optical system, arranged in the manner which I have described as a particular example of an embodiment of my invention, the overall optical effect of the various optical elements shown for instance in Figure 11, is to reduce the width of striation recorded on the films to about one-sixth of what it would be without the cylindrical lens element which I disclose, assuming a given width of the initial light source slit corresponding to my prism edge 5. Or, to put it another way, assuming a given maximum allowable striation width on the film, the effect of my optical system is to make possible a width of the initial light source slit about six times as wide as would otherwise be possible.

A conventional type of objective, as shown at 11, will reduce the apparent width of the light source slit, as delivered to the film, by about one half, without using any of the special cylindrical lenses which I describe. The special intermediate cylindrical lens which I have shown at 8 and 23, will reduce the apparent width of the slit by a factor of about three. The final cylindrical lens, which I have shown for instance at 30, will further reduce the apparent slit width by a factor of about two. The overall effect of the two cylindrical lenses and the objective is to reduce the apparent width of the slit by a factor of about twelve, which is six times as much reduction as would be obtainable by the objective alone. This is in addition to the light concentrating effect obtained with the form of prism with bevelled edge which I describe.

As I have stated, assuming a maximum allowable striation width on the film of .025 millimeter, it is possible to have a maximum source slit of only .05 millimeter if only the objective is employed without my cylindrical lenses, while employing my cylindrical lens elements, the light source slit can be .30 millimeter wide, with a corresponding increase in the amount of light flux delivered to the film, and increased clarity and definition of the sound record on the film.

From the foregoing description of the construction of my improved device, the operation thereof and the method of applying the same to use will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, without departing from the spirit or sacrificing any of the principles of the invention.

Having thus described the invention, what I claim is:

1. In an optical system for recording sound on film, a slit, an objective lens unit, a negative cylindrical lens mounted in register with said objective lens unit on one side thereof and having a plane face and also having a concave cylindrical face facing said objective lens unit, said negative cylindrical lens being mounted with its axis substantially parallel to said slit, and a crossed cylindrical lens unit in register with said objective lens unit and on the side thereof opposite said negative cylindrical lens, said crossed cylindrical lens unit comprising a pair of adjacent cylindrical lenses having their axes mutually perpendicular, the axis of one of said last mentioned cylindrical lenses being parallel to the axis of said negative cylindrical lens.

2. In an optical system for recording sound on film, a slit, an objective lens unit, a negative cylindrical lens mounted in register with said objective lens unit on one side thereof and having a plane face and also having a concave cylindrical face facing said objective lens unit, said negative cylindrical lens being mounted with its axis substantially parallel to said slit, and a crossed cylindrical lens unit in register with said objective lens unit and on the side thereof opposite said negative cylindrical lens, said crossed cylindrical lens unit comprising a plano-concave cylindrical lens having a plane face and also having a concave cylindrical face facing said objective lens unit, the axis of said concave cylindrical face being substantially perpendicular to the axis of said first mentioned negative cylindrical lens, said crossed cylindrical lens unit further comprising a plano-convex cylindrical lens having a convex face and also having a plane face facing the plane face of said plano-concave lens and being adjacent thereto, the axis of said plano-convex cylindrical lens being parallel to the axis of said first mentioned negative cylindrical lens and also being substantially perpendicular to the axis of said plano-concave lens.

3. In an optical system for recording sound on film, a slit, an objective lens unit, a negative cylindrical lens mounted in register with said objective lens unit on one side thereof and having a plane face and also having a concave cylindrical face facing said objective lens unit, said negative cylindrical lens being mounted with its axis substantially parallel to said slit, a slotted film gate plate mounted on the side of said objective lens unit opposite said first mentioned negative cylindrical lens, the length of the slot in said plate being substantially perpendicular to the axis of said first mentioned negative cylindrical lens, and a plano-convex cylindrical lens having its convex face fitted in said slot in said plate with its axis substantially perpendicular to the length of said slot and having its plane face facing said objective lens unit.

4. In an optical system for recording sound on film, a slit, an objective lens unit, a negative cylindrical lens mounted in register with said objective lens unit on one side thereof and having a plane face and also having a concave cylindrical face facing said objective lens unit, said negative cylindrical lens being mounted with its axis substantially parallel to said slit, a slotted film gate plate mounted on the side of said objective lens unit opposite said first mentioned negative cylindrical lens, the length of slot in said plate being substantially perpendicular to the axis of said first mentioned negative cylindrical lens, and a double convex cylindrical lens having two opposed convex faces with parallel axes and substantially equal radii, said double convex cylindrical lens being fitted in said slot in said plate with its axes substantially perpendicular to the length of said slot.

5. In an optical system for recording sound on film, an axially symmetrical casing, a condensing lens unit in one end of said casing, an objective lens unit in the other end of said casing, an isosceles triangular prism in said casing between said condensing lens unit and said objective lens unit and adjacent said condensing lens unit and mounted with its base substantially perpendicular to the axis of said casing and adjacent said condensing lens unit, said triangular prism having its edge vertex opposite said base bevelled substantially parallel to said base, an intermediate cylindrical lens mounted diametrally in said casing with its axis substantially parallel to said vertex of said prism and between said prism and said objective lens unit, and a final cylindrical lens adjacent said objective lens unit and on the side of said objective lens unit opposite said prism and with its axis substantially parallel to said vertex of said triangular prism.

6. In an optical system for recording sound on film, an axially symmetrical casing, a condensing lens unit in one end of said casing, an objective lens unit in the other end of said casing, an isosceles triangular prism in said casing between said condensing lens unit and said objective lens unit and mounted with its base substantially perpendicular to the axis of said casing and adjacent said condensing lens unit, said triangular prism having its edge vertex opposite said base bevelled substantially parallel to said base, and a cylindrical lens mounted in said casing substantially perpendicular to the axis thereof and with its axis substantially parallel to said vertex of said prism and between said prism and said objective lens unit, said cylindrical lens comprising a circular disc provided with a semi-cylindrical diametral aperture on one face thereof.

7. In an optical system for recording sound on film, an axially symmetrical casing, a condensing lens unit in one end of said casing, an objective lens unit in the other end of said casing, an isosceles triangular prism in said casing between said condensing lens unit and said objective lens unit and mounted with its base substantially perpendicular to the axis of said casing and adjacent said condensing lens unit, said triangular prism having its edge vertex opposite said base bevelled substantially parallel to said base, a negative concave cylindrical lens mounted diametrally in said casing with its axis substantially parallel to said vertex of said prism and between said prism and said objective lens unit, said negative concave cylindrical lens being positioned substantially at an axial distance from said bevelled vertex equal to twice the focal length of said cylindrical lens.

8. In a recording sound camera, an axially symmetrical casing, a condensing lens unit in one end of said casing, an objective lens unit in the other end of said casing, an isosceles triangular prism in said casing between said condensing lens unit and said objective lens unit and mounted with its base substantially perpendicular to the axis of said casing and adjacent said condensing lens unit, said triangular prism having its edge vertex opposite said base bevelled substantially parallel to said base, an intermediate negative cylindrical lens mounted in said casing with its axis substantially perpendicular to the axis thereof and substantially parallel to said vertex of said prism and between said prism and said objective lens unit, a slotted soundtrack film gate plate having the length of its slot substantially perpendicular to said vertex of said triangular prism and mounted outside said casing and adjacent said objective lens unit, and a final positive cylindrical lens mounted in juxtaposition to said slot in said plate and having its axis substantially perpendicular to the length of said slot and parallel to said edge vertex of said triangular prism.

9. In an optical system for recording sound on film, an axially symmetrical casing, a condensing lens unit in one end of said casing, an objective lens unit in the other end of said casing, an isosceles triangular prism between said condensing lens unit and said objective lens unit and mounted with its base substantially perpendicular to the axis of said casing and adjacent said condensing lens unit, said triangular prism having its edge vertex opposite said base bevelled substantially parallel to said base, an inner negative cylindrical lens mounted in said casing substantially perpendicular to the axis thereof and having its axis substantially parallel to said vertex of said prism and positioned between said prism and said objective lens unit, and a double convex cylindrical lens unit mounted outside said casing adjacent said objective lens unit, said doubly cylindrical lens unit comprising two optically opposed convex cylindrical lens elements of equal radius mounted with their axes parallel to said vertex of said prism.

10. In a recording sound camera, an axially symmetrical casing, a condensing lens unit in one end of said casing, an objective lens unit in the other end of said casing, an isosceles triangular prism in said casing between said condensing lens unit and said objective lens unit and mounted with its base substantially perpendicular to the axis of said casing and adjacent said condensing lens unit, said triangular prism having its edge vertex opposite said base bevelled substantially parallel to said base, an intermediate negative cylindrical lens mounted in said casing having its axis substantially perpendicular to the axis thereof and substantially parallel to said vertex of said prism and positioned between said prism and said objective lens unit, a slotted soundtrack film gate plate having the length of its slot substantially perpendicular to said vertex of said triangular prism and mounted outside said casing and adjacent said objective lens unit, and a double convex cylindrical lens unit mounted in juxtaposition to said slot in said plate and comprising two optically opposed convex cylindrical lens elements of equal radius mounted with their axes parallel to said vertex of said prism.

11. In an optical system for recording sound on film, an axially symmetrical casing, an objective lens unit in the other end of said casing, a condensing lens unit in one end of said casing, an isosceles triangular prism in said casing between said condensing lens unit and said objective lens unit and mounted with its base substantially perpendicular to the axis of said casing and adjacent said condensing lens unit, said triangular prism having its edge vertex opposite said base bevelled substantially parallel to said base, an intermediate negative cylindrical lens mounted in said casing substantially perpendicular to the axis thereof and having its axis substantially parallel to said vertex of said prism and positioned between said prism and said objective lens unit, and a final cylindrical lens unit mounted outside said casing adjacent said objective lens unit, said cylindrical lens unit comprising a pair of separate respectively positive and negative cylindrical lens elements positioned with their axes mutually perpendicular and with their common intersecting area in register with said objective lens unit, one of said cylindrical lens elements having its axis substantially parallel to said vertex of said prism.

12. In an optical system for recording sound on film, a slit, an objective lens unit, a negative cylindrical lens mounted in register with said objective lens unit between said slit and said objective lens unit and with its negative cylindrical face directed toward said objective lens unit, the axis of said negative cylindrical lens being substantially parallel to said slit, and a positive cylindrical lens mounted on the side of said objective lens unit opposite said negative cylindrical lens with a cylindrical face of said positive lens directed away from said objective lens unit, the axis of said positive cylindrical lens being substantially parallel to said slit.

13. In an optical system for recording sound on film, a slit, an objective lens unit, a negative cylindrical lens mounted in register with said objective lens unit between said slit and said objective lens unit and comprising a circular disc provided with a semi-cylindrical diametral aperture on one face thereof which is directed toward said objective lens unit, the axis of said semi-cylindrical aperture being substantially parallel to said slit, and a positive cylindrical lens mounted on the side of said objective lens unit opposite said negative cylindrical lens with a cylindrical face of said positive lens directed away from said objective lens unit, the axis of said positive cylindrical lens being substantially parallel to said slit.

14. In an optical system for recording sound on film, a slit, an objective lens unit, a negative cylindrical lens mounted in register with said objective lens unit on one side thereof and having a plane face and also having a concave cylindrical face facing said objective lens unit, said negative cylindrical lens being mounted with its axis substantially parallel to said slit, and a crossed cylindrical lens unit in register with said objective lens unit and on the side thereof opposite said negative cylindrical lens, said crossed cylindrical lens unit comprising a pair of adjacent cylindrical lenses having their axes mutually perpendicular and having substantially equal radii, the axis of one of said last mentioned cylindrical lenses being parallel to the axis of said first mentioned negative cylindrical lens.

15. In an optical system for recording sound on film, a slit, an objective lens unit, a negative cylindrical lens mounted in register with said objective lens unit on one side thereof and having a plane face and also having a concave cylindrical face facing said objective lens unit, said negative cylindrical lens being mounted with its axis substantially parallel to said slit, and a crossed cylindrical lens unit in register with said objective lens unit and on the side thereof opposite said negative cylindrical lens, said crossed cylindrical lens unit comprising a plano-concave cylindrical lens having a plane face and also having a concave cylindrical face facing said objective lens unit, the axis of said concave cylindrical face being substantially perpendicular to the axis of said first mentioned negative cylindrical lens, said crossed cylindrical lens unit further comprising a plano-convex cylindrical lens having a convex face and also having a plane face facing the plane face of said plano-concave lens and being adjacent thereto, the axis of said plano-convex cylindrical lens being parallel to the axis of said first mentioned negative cylindrical lens and also being substantially perpendicular to the axis of said plano-concave lens, the cylindrical lenses comprised in said crossed cylindrical lens unit having substantially equal radii.

JOHN H. EMMERICH.